United States Patent
Stefani et al.

(10) Patent No.: US 9,020,891 B1
(45) Date of Patent: Apr. 28, 2015

(54) REDUCED LOCKING IN A DISTRIBUTED DATA STORE

(75) Inventors: Stefano Stefani, Issaquah, WA (US); Jakub Kulesza, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 570 days.

(21) Appl. No.: 12/913,556

(22) Filed: Oct. 27, 2010

(51) Int. Cl.
*G06F 7/00* (2006.01)
*G06F 9/445* (2006.01)

(52) U.S. Cl.
CPC ........................................ *G06F 8/65* (2013.01)

(58) Field of Classification Search
None
See application file for complete search history.

(56) References Cited

U.S. PATENT DOCUMENTS

| | | | |
|---|---|---|---|
| 6,925,515 B2 * | 8/2005 | Burns et al. ............... | 710/200 |
| 7,103,740 B1 * | 9/2006 | Colgrove et al. ............. | 711/162 |
| 7,617,369 B1 * | 11/2009 | Bezbaruah et al. ............ | 711/162 |
| 7,624,155 B1 * | 11/2009 | Nordin et al. ................. | 709/208 |
| 7,788,233 B1 * | 8/2010 | Iyer et al. ....................... | 707/661 |
| 2005/0125464 A1 * | 6/2005 | Kline ............................ | 707/204 |
| 2005/0160315 A1 * | 7/2005 | Chandrasekaran et al. .... | 714/15 |
| 2007/0067373 A1 * | 3/2007 | Higgins et al. ................ | 707/206 |
| 2009/0292705 A1 * | 11/2009 | McKenney et al. ............. | 707/8 |
| 2009/0313311 A1 * | 12/2009 | Hoffmann et al. ............. | 707/204 |
| 2010/0115004 A1 * | 5/2010 | Liao ............................... | 707/822 |
| 2011/0137879 A1 * | 6/2011 | Dubey et al. ................... | 707/704 |

\* cited by examiner

*Primary Examiner* — Apu Mofiz
*Assistant Examiner* — Thu Nga Nguyen
(74) *Attorney, Agent, or Firm* — Thomas | Horstemeyer, LLP (57) ABSTRACT

Disclosed are various embodiments for reducing locking in a distributed data store that includes a primary data store and one or more secondary data stores. An update to a data item that is to be applied to the distributed data store is obtained in one or more computing devices. The update is applied to a cached version of the data item when a lock is held. The update is replicated to the one or more data stores after the lock is released. It is determined that the update is durably persisted in the distributed data store after obtaining a replication confirmation from each of at least a predetermined number of the secondary data stores.

20 Claims, 4 Drawing Sheets

REDUCED LOCKING IN A DISTRIBUTED DATA STORE

BACKGROUND

A data store, such as, for example, a relational database management system (RDBMS), etc., may be implemented as a distributed system. Distributed systems may offer significant benefits over non-distributed systems, such as, for example, improved availability and reliability, better fault tolerance, increased performance, easier expansion, and so on. One type of distributed data store employs single-master replication, where data written to a single primary data store are replicated to one or more secondary data stores.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to facilitating reduced locking in a distributed data store that employs single-master replication. When a request to modify a data item is obtained by the primary data store, the data item may be locked during the modification process to avoid race conditions created by other modification requests. However, in a distributed data store, replication of the modification to secondary data stores is a complex operation that may be time consuming. Various embodiments of the present disclosure avoid locking when the modification is being replicated, which may increase modification throughput by decreasing time spent waiting for a lock to be released. In the following discussion, a general description of the system and its components is provided, followed by a discussion of the operation of the same.

Figure 1:
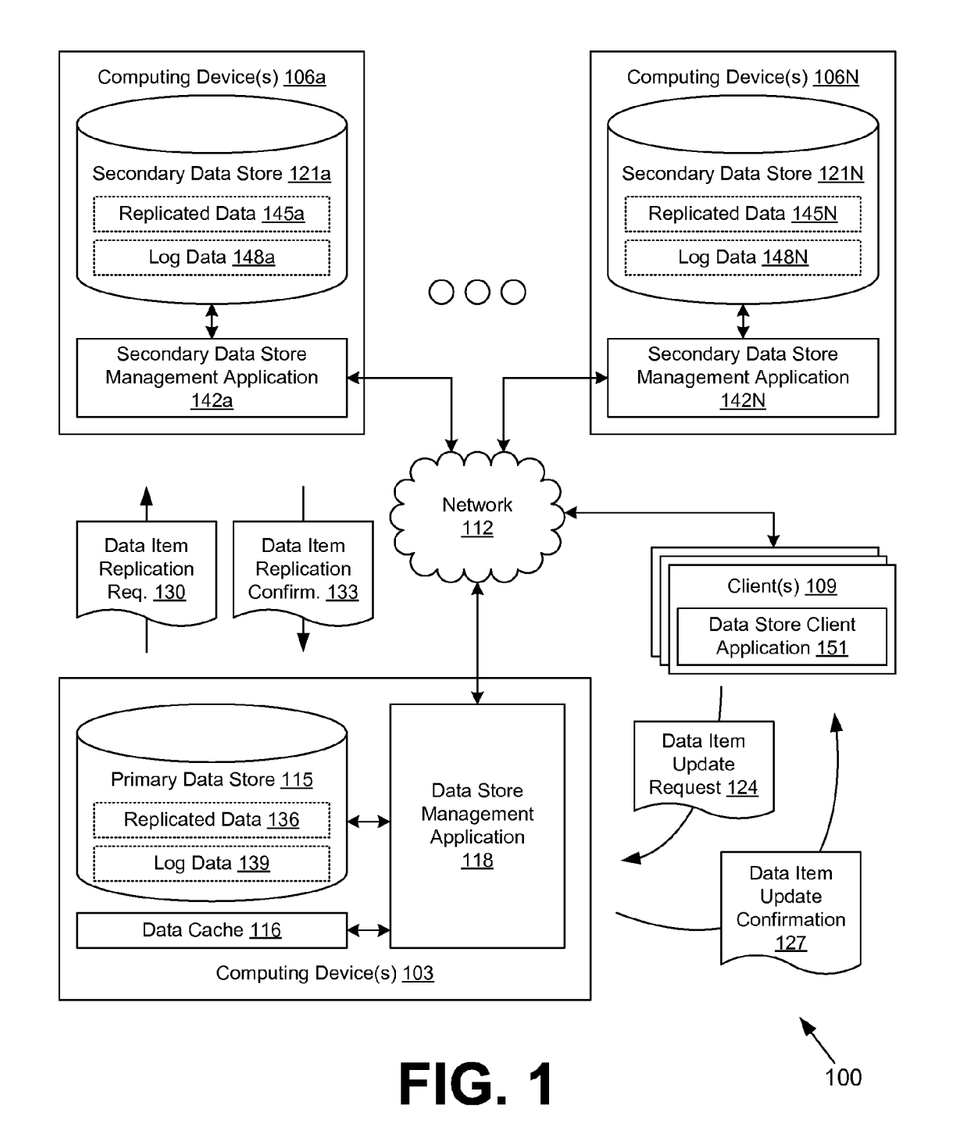
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 106a . . . 106N and one or more clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a primary data store 115 that is accessible to the computing device 103. The primary data store 115 may be representative of a plurality of data stores as can be appreciated. The data stored in the primary data store 115, for example, is associated with the operation of the various applications and/or functional entities described below. A data cache 116 may be associated with the primary data store 115. In one embodiment, the data cache 116 is maintained in volatile system memory of the computing device 103. However, in other embodiments, the data cache 116 may be maintained in other forms of memory. The data cache 116 may include, for example, future versions of data items, durable versions of data items, and/or other versions.

The components executed on the computing device 103, for example, include a data store management application 118, and other applications, services, processes, systems, engines, or functionality not discussed in detail herein. The data store management application 118 is executed to manage the primary data store 115 and to facilitate replication of data to one or more secondary data stores 121 that may be included in the computing devices 106. The data store management application 118 may obtain data item update requests 124 from the client 109 and respond with data item update confirmations 127. The data store management application 118 may also generate and send data item replication requests 130 to the computing devices 106 and obtain data item replication confirmations 133 from the computing devices 106.

The data stored in the primary data store 115 includes, for example, replicated data 136, log data 139, and potentially other data. The replicated data 136 includes any data maintained in the primary data store 115 that is durably persisted across a distributed data store that includes the primary data store 115 and the secondary data stores 121. The log data 139 describes a plurality of log entries that correspond to update transactions for various data items stored, or to be stored, in the replicated data 136. Each log entry describes an intent to make a change to a data item in the distributed data store. As a non-limiting example, a log entry may describe a change of inserting a data item with a specified list of attribute values. As another non-limiting example, a log entry may describe a change of modifying one or more attribute values of an existing data item. Each log entry may include a sequence number to maintain ordering of update transactions regarding a data item. The sequence number may be defined, for example, by a monotonically increasing sequence of integer values.

Each of the computing devices 106a . . . 106N may comprise, for example, a server computer or any other system providing computing capability. Alternatively, a respective plurality of computing devices 106a . . . 106N may be employed that are arranged, for example, in one or more server banks or computer banks or other arrangements. For example, a plurality of computing devices 106a ... 106N together may comprise a cloud computing resource, a grid computing resource, and/or any other distributed computing arrangement. Such computing devices 106a ... 106N may be located in a single installation or may be distributed among many different geographical locations. For purposes of convenience, the computing device 106 is referred to herein in the singular. Even though the computing device 106 is referred to in the singular, it is understood that a plurality of computing devices 106a ... 106N may be employed in the various arrangements as described above. It is noted that the computing device 106 may be functionally interchangeable with the computing device 103 in some embodiments.

Various applications and/or other functionality may be executed in the computing device 106 according to various embodiments. Also, various data is stored in a respective secondary data store 121a ... 121N that is accessible to the computing device 106. The respective secondary data store 121a ... 121N may be representative of a plurality of data stores as can be appreciated. The data stored in the secondary data store 121, for example, is associated with the operation of the various applications and/or functional entities described below.

The components executed on the computing device 106, for example, include a respective secondary data store management application 142, and other applications, services, processes, systems, engines, or functionality not discussed in detail herein. The secondary data store management application 142 is executed to manage the corresponding secondary data store 121. To this end, the secondary data store management application 142 is configured to obtain data item replication requests 130 from the primary data store 115. In response to the data item replication requests 130, the secondary data store management application 142 is configured to commit data item updates to the respective secondary data store 121 and to generate and send data item replication confirmations 133 to the primary data store 115.

The data stored in each respective secondary data store 121 includes, for example, corresponding replicated data 145, corresponding log data 148, and potentially other data. The replicated data 145 includes data items that have been replicated to the secondary data store 121 from the primary data store 115 and/or other data stores within the distributed data store. The log data 148 includes log entries that have been sent to the secondary data store 121. The log entries may be buffered and sequenced so that there are no gaps when they are applied to update the replicated data 145 under ordinary conditions.

The client 109 is representative of a plurality of client devices that may be coupled to the network 112. The client 109 may comprise, for example, a processor-based system such as a computer system. Such a computer system may be embodied in the form of a desktop computer, a laptop computer, a server computer, a cloud computing resource, a grid computing resource, personal digital assistants, cellular telephones, smartphones, set-top boxes, music players, web pads, tablet computer systems, game consoles, electronic book readers, or other devices with like capability. The client 109 may include a display such as, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as a data store client application 151 and/or other applications. The data store client application 151 may be executed in a client 109 to facilitate interaction with the data store management application 118. In one embodiment, the data store client application 151 may be configured, for example, to access and render network pages, such as web pages, or other network content served up by the computing device 103, the computing device 106, and/or other servers for the purpose of interfacing with the data store management application 118. In various embodiments, the data store client application 151 may comprise a thin client application, a thick client application, or another type of client application. Some embodiments may include a graphical user interface and/or a command-line interface. The client 109 may be configured to execute applications beyond the data store client application 151 such as, for example, browser applications, email applications, network page server applications, instant message applications, and/or other applications.

Next, a general description of the operation of the various components of the networked environment 100 is provided. To begin, a data item update request 124 is generated by a data store client application 151. Although the data store client application 151 is described as executed in a client 109, it is understood that the client 109 may correspond to a server computer that processes business logic, generates network pages, and/or performs other tasks. Thus, although a user may generate a data item update request 124 through a user interface, a data item update request 124 may also be generated automatically by business logic applications, workflow engines, network page generation applications, and/or other applications.

The data store client application 151 may correspond to a portion of another application, such as, for example, a module, a library, etc. in various embodiments. The data item update request 124 may be sent over the network 112 to the data store management application 118 using hypertext transfer protocol (HTTP), simple object access protocol (SOAP), remote procedure call (RPC), remote method invocation (RMI), and/or other protocols. In various embodiments, the data item update request 124 may describe updates to data items by using, for example, structured query language (SQL), extensible markup language (XML), JavaScript object notation (JSON), yet another markup language (YAML), and/or other formats.

In a distributed data store employing single-master replication, updates are directed to and processed by the single primary data store 115 instead of the secondary data stores 121. Although the primary data store 115 is represented in a computing device 103 and the secondary data stores 121 are represented in respective computing devices 106, it is understood that the hardware and software involved may be interchangeable. Therefore, in some embodiments, a secondary data store 121 and a secondary data store management application 142 may be able to perform the functions of a primary data store 115 and a data store management application 118 when elected to assume such a role.

Various update transactions may specify an optimistic concurrency control condition that is required to be verified for the update to be committed. With a distributed data store, the data item may be locked while changes are replicated to ensure that subsequent conditional updates are evaluated using durably persistent versions of the data item. However, locking the data item during the replication may introduce unacceptable latency and/or otherwise reduce update transaction throughput. Accordingly, in various embodiments, cached versions of the data item in the data cache 116 are employed for evaluating optimistic concurrency control conditions. Such cached versions, which have not yet been committed to the distributed data store, may be regarded as future versions of the data item.

A lock is held while a cached version of the data item is being used. However, the lock is released before the changes associated with the update transaction are replicated in the secondary data stores 121. Because optimistic concurrency control is used, the changes associated with the update transaction are propagated to the secondary data stores 121 by way of log entries embodied in the data item replication requests 130. The secondary data store management application 142 is configured to commit the changes described by the log entries embodied in the data item replication requests 130 to the respective secondary data store 121 in an order according to the sequence numbers of the log entries. Ultimately, the replicated data 145 is configured to mirror the replicated data 136. The secondary data store management application 142 may also be configured to save the log entries to the log data 148 to facilitate rollback of committed updates if necessary.

When one or more of the secondary data stores 121 respond to the data store management application 118 with a data item replication confirmation 133, the data store management application 118 is able to determine that the change has been made durably persistent in the distributed data store. The change may be committed to the primary data store 115, and a data item update confirmation 127 may be returned to the data store client application 151. When the cached version of the data item is no longer needed for pending update transactions, it may be discarded from the data cache 116.

When data item replication confirmations 133 are not received from a required number of secondary data stores 121, the data store management application 118 may deem the update to be not durably persistent in the distributed data store. In some embodiments, the secondary data store management applications 142 may be configured to send error notifications to the data store management application 118 when an expected data item replication request 130 is not received. Furthermore, updates to the data item that are subsequent to the instant update as determined by the sequence number are also determined to be not durably persistent either. To the extent that any such updates have been committed to the primary data store 115 and/or the secondary data stores 121, such updates may be rolled back using the corresponding log entries in the log data 139 and/or the log data 148.

In addition, the distributed data store may be configured to elect a new primary data store 115 upon a data replication failure. It may be said that the replication pipeline is to be dismantled when such a failure occurs. In such a case, one of the secondary data stores 121 may assume the function of the current primary data store 115, and the respective secondary data store management application 142 may assume the function of the current data store management application 118. Likewise, the current primary data store 115 may assume the function of a secondary data store 121, and the data store management application 118 may assume the function of a secondary data store management application 142.

Various embodiments may even benefit update operations that do not use optimistic concurrency control conditions. As a non-limiting example, a hit counter in a network page may be frequently implemented. By using a cached version of the data item, the counter can be incremented by a fixed amount without waiting for the change to replicate. Consequently, a greater update throughput may be achieved.

Another benefit of using a data cache 116 in the embodiments described herein is to improve the speed of responding to requests to read data items that are being updated. Some operations, such as incrementing a counter in response to network page views on a network site, may involve frequently repeated update transactions. Rather than waiting for an update to be fully committed to the primary data store 115 and the secondary data stores 121, the data store management application 118 may produce the current state of the data item as reflected in the durable cached version of the data item in the data cache 116. As a non-limiting example, it may be the case that committing the change to the primary data store 115 may be delayed because of batching. Accordingly, it may be faster to obtain a durable cached version of the data item that includes the change instead of reading the data item directly from the primary data store 115.

Figure 2A:
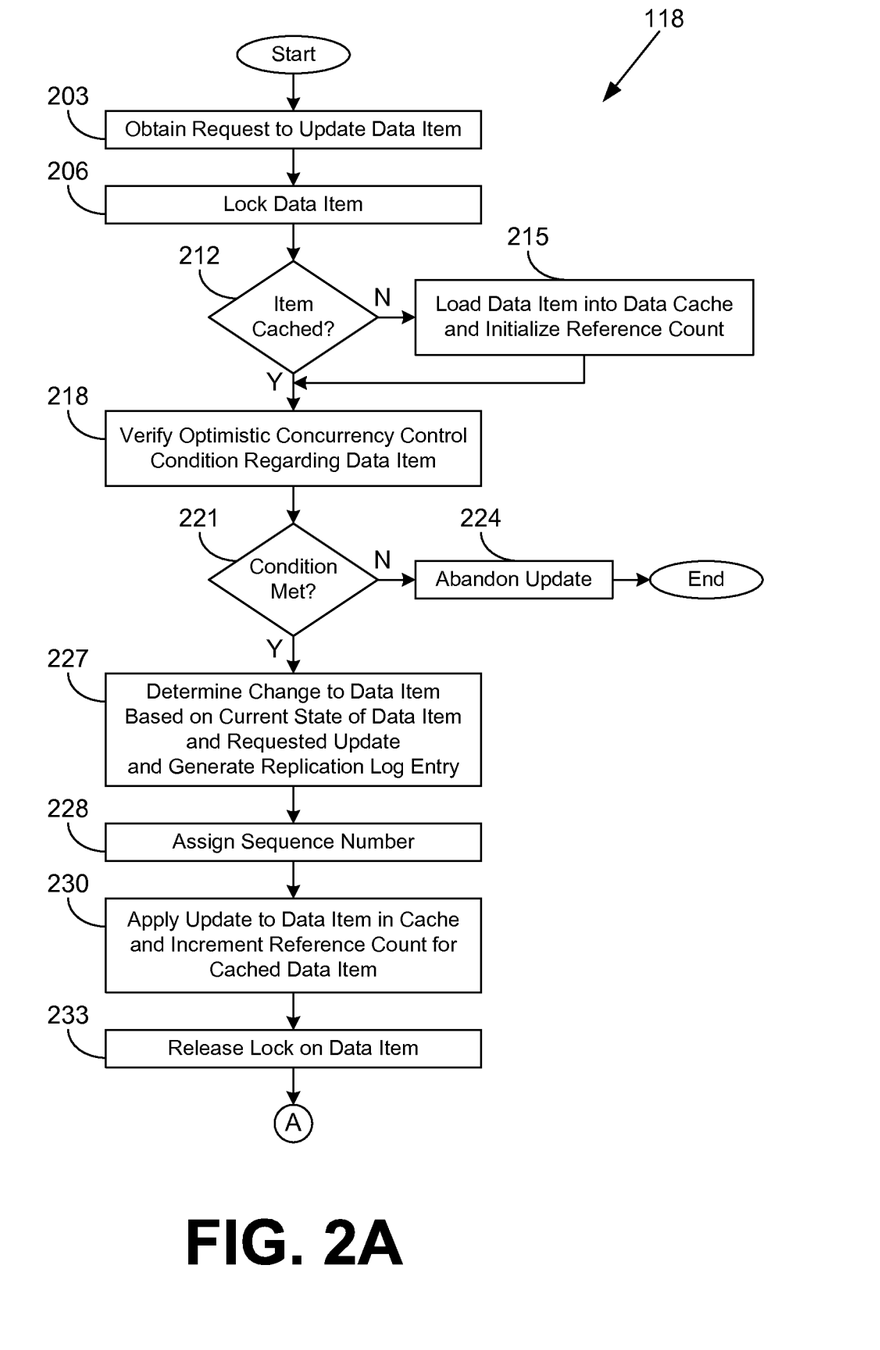
FIGS. 2A and 2B show a flowchart illustrating one example of functionality implemented as portions of a data store management application executed in a computing device in the networked environment of FIG. 1 according to various embodiments of the present disclosure.
Figure 2B:
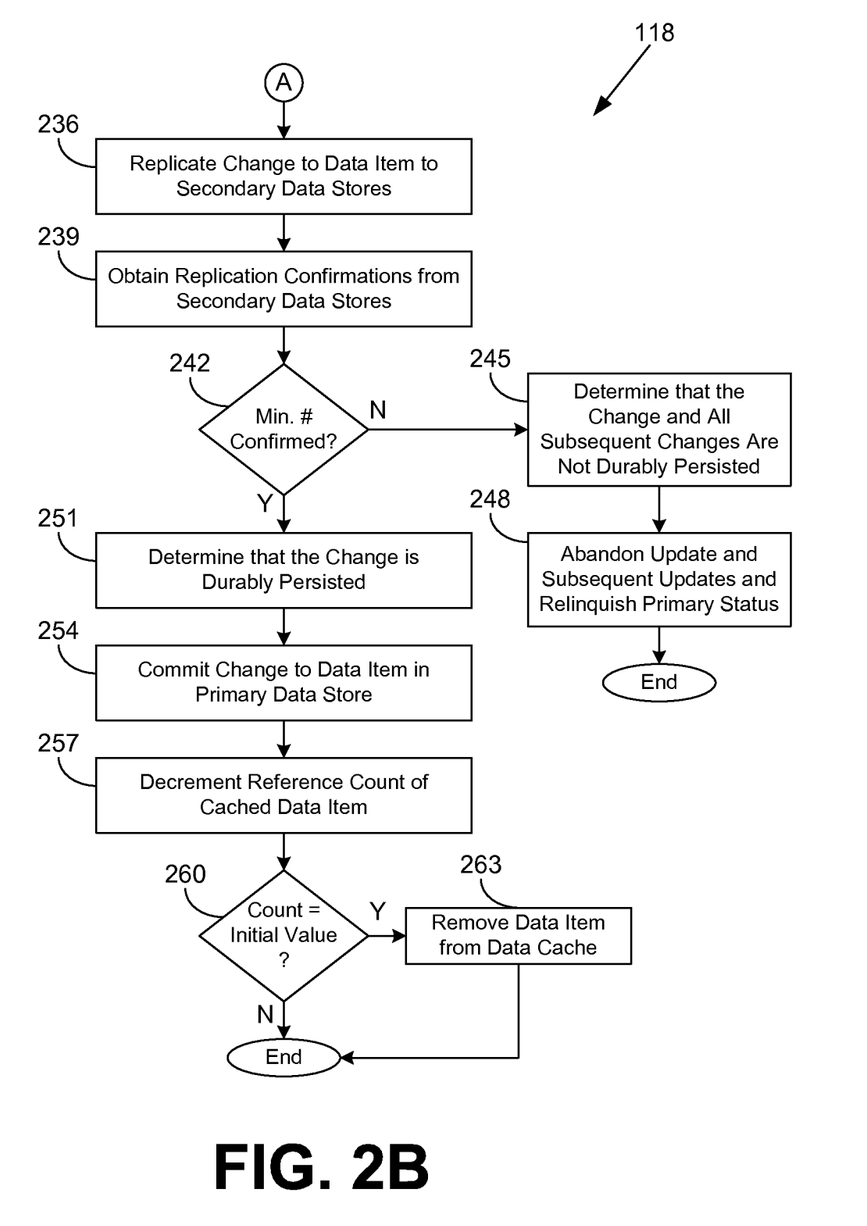

Referring next to FIGS. 2A and 2B, shown is a flowchart that provides one example of the operation of a portion of the data store management application 118 according to various embodiments. It is understood that the flowchart of FIGS. 2A and 2B provides merely an example of the many different types of functional arrangements that may be employed to implement the operation of the portion of the data store management application 118 as described herein. As an alternative, the flowchart of FIGS. 2A and 2B may be viewed as depicting an example method implemented in the computing device 103 (FIG. 1) according to one or more embodiments.

Beginning with box 203 in FIG. 2A, the data store management application 118 executed in association with the primary data store 115 (FIG. 1) obtains a request to update a data item in a distributed data store. Such a request may correspond to a data item update request 124 (FIG. 1) generated by a data store client application 151 (FIG. 1) that is executed in a client 109 (FIG. 1). As a non-limiting example, the request may comprise structured query language (SQL) code for inserting or updating one or more rows within one or more tables in a relational database. As another non-limiting example, the request may include an update to a serialized object that is stored within a data store.

In box 206, the data store management application 118 acquires or establishes a lock respecting the data item(s) to be added or modified. If the data item is already locked, the data store management application 118 may be configured, for example, to block execution of the current process, thread, workflow, etc. until the lock is released or to poll repeatedly until the lock is released.

In box 212, the data store management application 118 determines whether the data item has been loaded into the data cache 116 (FIG. 1). If the data item has not been loaded into the data cache 116, the data store management application 118 proceeds to box 215 and loads the data item into the data cache 116, thereby generating a cached version of the data item. In addition, a reference count associated with the cached version of the data item may be initialized by the data store management application 118 to an initial value, e.g., zero or some other initial value.

In box 218, the data store management application 118 verifies an optimistic concurrency control condition regarding the data item and embodied in the request. Where the condition refers to a data item that is being updated, the cached version of the data item is used. As a non-limiting example, such a condition may specify that a data item is required to have a certain value or range of values for the update to be applied. The update request may not include a condition in some cases, e.g., where the update request is a simple increment operation, etc. In box 221, the data store management application 118 determines whether the condition verified in box 218 is met. If the condition is not met, the update is abandoned in box 224, and the portion of the data store management application 118 ends. If the condition is met, the data store management application 118 proceeds to box 227.

In box 227, the data store management application 118 determines the change to the data item based at least in part on the current state of the data item in the cached version of the data item and the update request. As a non-limiting example, if the update request specifies that an integer item, which has a current value of 100, is to be squared, the data store management application 118 may determine that the change to the item is a multiplication by 100. The data store management application 118 may also generate a replication log entry in box 227 and add it to a queue for transmission to the secondary data stores 121.

In box 228, the data store management application 118 assigns a sequence number to the update. The sequence number is used in the corresponding log entry to ensure that updates to data items are properly sequenced and applied in order of their receipt at the primary data store 115. In various embodiments, the sequence number may correspond to a logical or physical timestamp. In various embodiments, the sequence number may be assigned before or after box 227. In box 230, the update is applied to the cached version of the data item. The cached version now corresponds to a future version of the data item, as opposed to a committed version of the data item. Also, the reference count associated with the cached version of the data item is incremented. In box 233, the lock regarding the data item to be updated is released.

Next, in box 236 of FIG. 2B, the data store management application 118 replicates the change to the data item to the secondary data stores 121 (FIG. 1) of the distributed data store. To this end, a log entry describing the intent to change the data item may be sent in a data item replication request 130 (FIG. 1) to each secondary data store 121 over the network 112 (FIG. 1). The current process, thread, workflow, etc. of the data store management application 118 may then block or poll until data item replication confirmations 133 (FIG. 1) are obtained from the secondary data stores 121 in box 239.

In box 242, the data store management application 118 determines whether data item replication confirmations 133 have been obtained from a minimum number of the secondary data stores 121. The minimum number may be, for example, one, all, or some other predetermined number of the secondary data stores 121. If data item replication confirmations 133 have not been obtained from a minimum number of the secondary data stores 121, the data store management application 118 transitions to box 245 and determines that this change and all subsequent changes are not durably persisted in the distributed data store. Consequently, in box 248, the instant update and subsequent updates are abandoned. In addition, the data store management application 118 may relinquish primary status for the primary data store 115. A new primary data store 115 may then be elected from among the secondary data stores 121. Thereafter, the portion of the data store management application 118 ends.

If the data store management application 118 determines in box 242 that data item replication confirmations 133 have been received from a minimum number of secondary data stores 121, the data store management application 118 instead proceeds to box 251 and determines that the change is durably persisted in the distributed data store. At this point, the future version of the data item in the data cache 116 may be marked as committed. Accordingly, a data item update confirmation 127 (FIG. 1) may be returned to the data store client application 151 that originated the update request. In box 254, the change to the data item is committed to the replicated data 136 (FIG. 1) of the primary data store 115.

In some embodiments, there may be a delay between determining that the change is durably persisted and setting the future version of the data item in the data cache 116 to be committed in box 251 and committing the change to the primary data store 115 in box 254. During this time frame, the data store management application 118 may be optimized to respond to read requests for affected data items using the cached versions of the data items which are durable but not yet committed. This functionality will be discussed further in connection with the flowchart of FIG. 3.

In box 257, the reference count of the cached version of the data item is decremented. If the data store management application 118 determines in box 260 that the reference count has returned to its initial value, the data store management application 118 removes the cached version of the data item from the data cache 116 in box 263. If the reference count has not returned to its initial value, the cached version of the data item is left in the data cache 116. Thereafter, the portion of the data store management application 118 ends.

Figure 3:
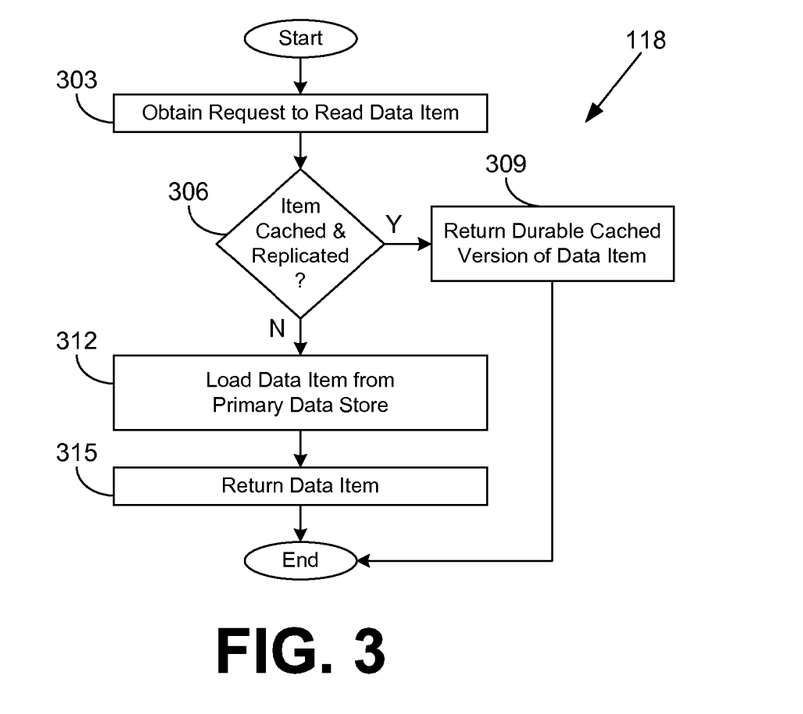
FIG. 3 is a flowchart illustrating another example of functionality implemented as portions of the data store management application executed in a computing device in the networked environment of FIG. 1 according to various embodiments of the present disclosure.

Turning now to FIG. 3, shown is a flowchart that provides one example of the operation of another portion of the data store management application 118 according to various embodiments. It is understood that the flowchart of FIG. 3 provides merely an example of the many different types of functional arrangements that may be employed to implement the operation of the portion of the data store management application 118 as described herein. As an alternative, the flowchart of FIG. 3 may be viewed as depicting an example method implemented in the computing device 103 (FIG. 1) according to one or more embodiments.

Beginning with box 303, the data store management application 118, operating in association with the primary data store 115 (FIG. 1), obtains a request to read a data item stored in the distributed data store. The request may be obtained, for example, from a data store client application 151 (FIG. 1) executed in a client 109 (FIG. 1). In box 306, the data store management application 118 determines whether a version of the data item is stored in the data cache 116 (FIG. 1) and whether that version has been replicated to the secondary data stores 121 (FIG. 1).

In some embodiments, there may be a delay between learning that a change is durable and the change being committed to the data store. In such a case, the cached version of the data item that is durable is returned. Therefore, if a cached version of the data item exists and has been replicated, in box 309, the data store management application 118 returns the durable cached version of the data item which has been marked as committed. Thereafter, the portion of the data store management application 118 ends.

In various embodiments, it may be faster for the data store management application 118 to return the data item from the data cache 116 than from a version committed to disk or another storage medium. For example, where the data cache 116 is loaded within system memory, the data access latency may be lower than with disk-based storage. Further, the commit process for the primary data store 115 may add latency.

However, if the data store management application 118 determines in box 306 that a cached version of the data item does not exist or has not been replicated, the data store management application 118 transitions to box 312 and loads the data item from the replicated data 136 (FIG. 1) in the primary data store 115. The data item is then returned in box 315. Thereafter, the portion of the data store management application 118 ends.

Figure 4:
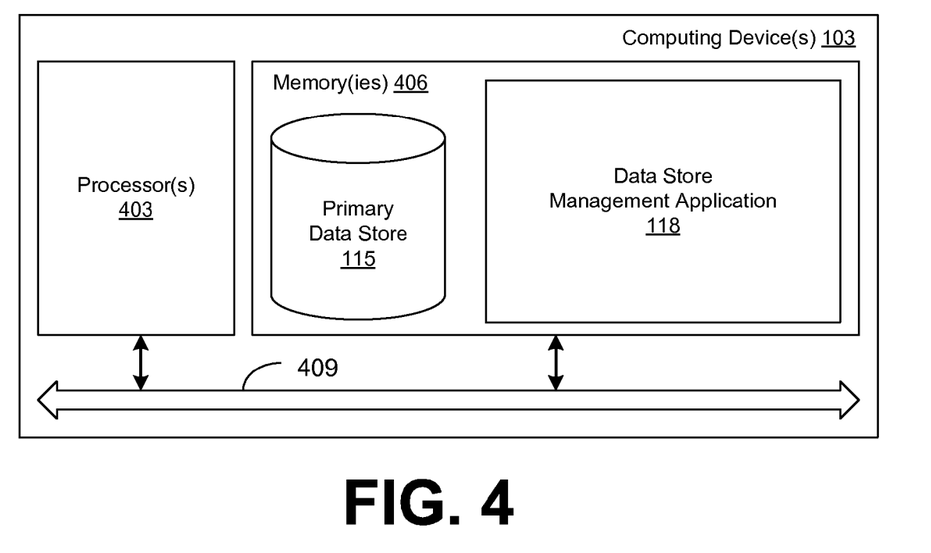
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 is the data store management application 118 and potentially other applications. Also stored in the memory 406 is the primary data store 115 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 112 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the data store management application 118 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2A, 2B, and 3 show the functionality and operation of an implementation of portions of the data store management application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2A, 2B, and 3 show a specific order of execution, it is understood that the order of execution may differ from that which is depicted. For example, the order of execution of two or more blocks may be scrambled relative to the order shown. Also, two or more blocks shown in succession in FIGS. 2A, 2B, and 3 may be executed concurrently or with partial concurrence. Further, in some embodiments, one or more of the blocks shown in FIGS. 2A, 2B, and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data store management application 118, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that obtains a first update to a data item that is to be applied to a distributed data store that employs single-master replication, the distributed data store including a primary data store and a plurality of secondary data stores that replicate the primary data store, the code that obtains the first update further acquiring a lock relative to the data item;
   code that loads the data item from the primary data store into a cache when the lock is held, thereby producing a cached version of the data item;
   code that verifies whether a condition associated with the first update is met based at least in part on the cached version of the data item when the lock is held;
   code that applies the first update to the cached version of the data item when the lock is held and then releases the lock;
   code that replicates the first update to the secondary data stores when the lock is released;
   code that determines that the first update has been durably persisted in the distributed data store when a replication confirmation for the first update has been obtained from at least one of the secondary data stores;
   code that obtains a second update to the data item and acquires the lock;
   code that verifies whether a condition associated with the second update is met based at least in part on the cached version of the data item when the lock is held;
   code that applies the second update to the cached version of the data item when the lock is held and then releases the lock;
   code that replicates the second update to the secondary data stores when the lock is released; and
   code that determines that the second update has been durably persisted in the distributed data store when a replication confirmation for the second update has been obtained from at least one of the secondary data stores.

2. The non-transitory computer-readable medium of claim 1, wherein the program further comprises code that discards the cached version of the data item from the cache after the first update and the second update have been replicated.

3. The non-transitory computer-readable medium of claim 1, wherein the secondary data stores are configured to apply the first update and the second update sequentially according to a corresponding sequence number associated with each update.

4. A system, comprising:
   at least one computing device;
   a distributed data store including a primary data store and at least one secondary data store that replicates the primary data store; and
   a data store management application executable in the at least one computing device, the data store management application comprising:
      logic that obtains an update to a data item that is to be applied to the primary data store and the at least one secondary data store;
      logic that applies the update to a cached version of the data item when a lock is held;
      logic that replicates the update to the at least one secondary data store after the lock is released; and
      logic that determines that the update is durably persisted in the distributed data store after obtaining a replication confirmation from each of at least a predetermined number of the at least one secondary data store.

5. The system of claim 4, wherein the logic that determines that the update is durably persisted in the distributed data store further comprises logic that commits the update to the primary data store.

6. The system of claim 4, wherein the data store management application further comprises logic that verifies a condition associated with the update against the cached version of the data item when the lock is held but before the update is applied to the cached version of the data item.

7. The system of claim 4, wherein the data store management application further comprises logic that maintains a reference count associated with the cached version of the data item such that the reference count is increased relative to the update being applied to the cached version of the data item and the reference count is decreased relative to the update being durably persisted.

8. The system of claim 7, wherein the data store management application further comprises:
   logic that initializes the cached version of the data item by loading the data item from the primary data store into a cache; and
   logic that purges the cached version of the data item from the cache relative to the reference count meeting an initial value.

9. The system of claim 8, wherein the cache is maintained in a system memory of the at least one computing device.

10. The system of claim 4, wherein the data store management application further comprises logic that determines that the update is not durably persisted in the distributed data store.

11. The system of claim 10, wherein the data store management application further comprises logic that elects one of the at least one secondary data store to assume a primary data store status in the distributed data store when the update is determined not to be durably persisted in the distributed data store.

12. The system of claim 10, wherein the logic that determines that the update is not durably persisted in the distributed data store is configured to determine that the update is not durably persisted when a predetermined time period has elapsed and the replication confirmation has not been obtained from each of at least the predetermined number of the at least one secondary data store.

13. The system of claim 10, wherein the logic that determines that the update is not durably persisted in the distributed data store is further configured to determine that at least one subsequent update to the data item is not durably persisted in the distributed data store when the update is determined not to be durably persisted in the distributed data store.

14. The system of claim 4, wherein the data store management application further comprises logic that generates a log entry that describes the update to the data item based at least in part on a current state of the cached version of the data item, the log entry being associated with a corresponding sequence number.

15. The system of claim 14, wherein the logic that replicates the update is configured to send the log entry to each of the at least one secondary data store, the at least one secondary data store being configured to commit the update described by the log entry and another update to the data item described by another log entry to the at least one secondary data store in an order determined according to the corresponding sequence numbers.

16. A method, comprising:
obtaining, in at least one computing device, an update to a data item that is to be applied to a distributed data store that includes a primary data store and at least one secondary data store;
establishing, in the at least one computing device, a lock relative to the data item;
verifying, in the at least one computing device, whether a condition associated with the update is met based at least in part on a cached version of the data item when the lock is held;
applying, in the at least one computing device, the update to the cached version of the data item when the lock is held and then releasing the lock;
replicating, in the least one computing device, the update to the at least one secondary data store when the lock is released; and
confirming, in the at least one computing device, that the update is durably persisted in the distributed data store when a replication confirmation is obtained from at least a predetermined number of the at least one secondary data store.

17. The method of claim 16, further comprising obtaining, in the at least one computing device, a request embodying the update from a client computing device.

18. The method of claim 16, further comprising committing, in the at least one computing device, the update to the data item to the primary data store in response to confirming that the update is durably persisted in the distributed data store.

19. The method of claim 16, further comprising abandoning, in the at least one computing device, the update when the condition is not met.

20. The method of claim 16, further comprising:
obtaining, in the at least one computing device, a request to read the data item from a client computing device; and
returning, in the at least one computing device, the cached version of the data item to the client computing device when all updates that have been applied to the cached version of the data item are durably persisted in the distributed data store.

* * * * *